UNITED STATES PATENT OFFICE.

JAMES G. HOLLIDAY, OF WHEELING, W. VA., ASSIGNOR TO HIMSELF, WM. HASTINGS, J. HARLAN, AND R. A. McCABE, OF THE SAME PLACE.

IMPROVED COMPOSITION ROOFING.

Specification forming part of Letters Patent No. 58,169, dated September 18, 1866.

*To all whom it may concern:*

Be it known that I, JAMES G. HOLLIDAY, of Wheeling, in the county of Ohio and State of West Virginia, have invented a new and useful Improvement in Composition Roofing; and I do hereby declare that the following is a full, clear, and exact description thereof, which will enable others skilled in the art to fully understand and make use of the same.

My invention has for its object to furnish a cheap and very durable composition for roofing houses, steamboats, rail-cars, &c., painting the hulls of steamboats or other vessels, or any surface where a fire or water proof composition is required, which will not run or melt from the effect of the sun's rays or of artificial heat, and which will not be affected by frost or cold; and it consists of a composition roofing formed by combining coal-tar, still-bottom of petroleum, acid-tar, finely-ground brick-clay, and refuse lime from gas-house, in the proportions and in the manner hereinafter more fully described.

The composition is formed of the following ingredients in the following proportions: coal-tar, forty-two gallons; still-bottom of petroleum, two gallons; acid-tar, one-half of a pint; finely-powdered brick-clay, one and a half bushel; and refuse lime from gas-house, one and a half bushels.

In preparing the composition I add the acid-tar to the coal-tar and let the mixture stand about twenty minutes. The effect of the acid-tar is to cook the mixture, so that the application of heat for that purpose is unnecessary. I then add the still-bottom oil, and afterward stir in the clay and lime, stirring and mixing the composition thoroughly. I then let the mixture stand for ten or twelve hours, when it will be ready for use.

The composition may be applied to the surface to be covered with a whitewash brush or in any other convenient manner. This composition will not be affected by heat, cold, or wet, and may be applied to any surface requiring a water-proof or fire-proof covering.

I claim as new and desire to secure by Letters Patent—

An improved composition roofing formed by combining coal-tar, acid-tar, still-bottom of petroleum, finely-ground brick-clay, and refuse lime from gas-house, in the proportions and in the manner substantially as herein described, and for the purposes set forth.

JAS. G. HOLLIDAY.

Witnesses:
JAS. P. WILKINSON,
S. P. HILDRETH.